US007006846B2

(12) United States Patent
Stratmoen et al.

(10) Patent No.: US 7,006,846 B2
(45) Date of Patent: Feb. 28, 2006

(54) CREDIT CARD COMMUNICATION SYSTEM

(75) Inventors: Scott Alan Stratmoen, Arlington Heights, IL (US); Jeffrey Jay Stone, North Barrington, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 577 days.

(21) Appl. No.: 09/802,296

(22) Filed: Mar. 8, 2001

(65) Prior Publication Data
US 2002/0128034 A1 Sep. 12, 2002

(51) Int. Cl.
*H04M 1/00* (2006.01)
(52) U.S. Cl. ............... 455/558; 455/90.3; 455/575.7
(58) Field of Classification Search ........... 455/558, 455/414.1, 550.1, 88, 575.6, 90.3, 90.2, 557, 455/575.1, 575.3, 575.7, 575.8, 90.1; 343/880, 343/881, 873, 760 MS, 702, 846, 882; 235/487, 235/488, 492
See application file for complete search history.

(56) References Cited

U.S. PATENT DOCUMENTS

| | | | |
|---|---|---|---|
| 3,713,148 A * | 1/1973 | Cardullo et al. ............... 342/42 |
| 4,110,561 A | 8/1978 | Guess ..................... 179/2 EA |
| 4,232,318 A | 11/1980 | Becker et al. ................ 370/29 |
| 4,293,818 A * | 10/1981 | Jarger ......................... 329/325 |
| 4,680,785 A * | 7/1987 | Akiyama et al. .......... 340/7.21 |
| 4,761,813 A | 8/1988 | Gammel ........................ 380/6 |
| 4,894,663 A | 1/1990 | Urbish et al. |
| 4,935,745 A | 6/1990 | Mori et al. ................. 343/702 |
| 5,067,172 A | 11/1991 | Schloemer ................... 455/34 |
| 5,315,636 A * | 5/1994 | Patel ..................... 379/201.07 |
| 5,361,061 A * | 11/1994 | Mays et al. ................ 340/7.54 |
| 5,371,901 A | 12/1994 | Reed et al. .................... 455/69 |
| 5,404,577 A | 4/1995 | Zuckerman et al. .......... 455/66 |
| 5,506,867 A | 4/1996 | Kotzin et al. ............... 375/220 |
| D379,006 S | 4/1997 | Gaumet ..................... D14/117 |
| 5,621,913 A | 4/1997 | Tuttle et al. .................. 455/90 |
| 5,628,031 A | 5/1997 | Kikinis et al. |
| D384,971 S | 10/1997 | Kawan ......................... D19/9 |
| 5,724,417 A * | 3/1998 | Bartholomew et al. 379/211.05 |
| 5,771,438 A | 6/1998 | Palermao et al. ............. 455/41 |
| 5,778,322 A | 7/1998 | Rydbeck ..................... 455/558 |
| 5,828,346 A * | 10/1998 | Park ........................... 343/826 |
| 5,856,786 A | 1/1999 | DiFrancisco et al. |
| 5,864,481 A | 1/1999 | Gross et al. ................. 364/400 |
| 5,867,131 A * | 2/1999 | Camp et al. ................ 343/797 |
| 5,873,031 A * | 2/1999 | Griffith et al. ........... 455/432.1 |
| 5,877,675 A * | 3/1999 | Rebstock et al. ....... 340/286.07 |
| 5,878,334 A | 3/1999 | Talisa et al. |
| 5,918,163 A * | 6/1999 | Rossi ......................... 455/558 |
| 5,970,402 A * | 10/1999 | Vermeer ..................... 455/347 |
| 5,999,821 A | 12/1999 | Kaschke |
| 6,024,285 A * | 2/2000 | Mish ........................... 235/492 |

(Continued)

OTHER PUBLICATIONS

DuPont i-Technologies acquies UNIAX Corporation article (2 pages) Mar. 15, 2000.

*Primary Examiner*—Charles N. Appiah
(74) *Attorney, Agent, or Firm*—Stetina Brunda Garred & Brucker

(57) ABSTRACT

A system for long range communications is disclosed. The system includes a base station and credit card sized wireless long range communications devices. The wireless long range communication devices each include a transceiver, a man machine interface (e.g., display and pushbuttons), a processor, a power supply (e.g., primary and secondary battery) and an antenna. Preferably, the wireless communication devices are flexible (e.g., like a smart card).

51 Claims, 7 Drawing Sheets

U.S. PATENT DOCUMENTS

| | | |
|---|---|---|
| 6,097,934 A | 8/2000 | Spall et al. |
| 6,112,103 A * | 8/2000 | Puthuff ........................ 455/557 |
| 6,172,645 B1 * | 1/2001 | Hollander et al. .......... 343/702 |
| 6,173,189 B1 * | 1/2001 | Lockhart ..................... 455/561 |
| 6,211,613 B1 | 4/2001 | May |
| 6,240,301 B1 | 5/2001 | Phillips |
| 6,259,418 B1 * | 7/2001 | Jones et al. ................. 343/846 |
| 6,266,017 B1 | 7/2001 | Aldous |
| 6,348,897 B1 * | 2/2002 | Alameh et al. ............. 343/702 |
| 6,359,591 B1 * | 3/2002 | Mou ............................ 343/702 |
| 6,377,218 B1 * | 4/2002 | Nelson et al. ............... 343/702 |
| 6,400,931 B1 * | 6/2002 | Inkinen et al. .............. 455/90.1 |
| 6,535,172 B1 * | 3/2003 | Hirabayashi ................. 343/725 |
| 6,538,606 B1 * | 3/2003 | Quinn et al. ................ 343/702 |
| 6,541,908 B1 * | 4/2003 | Cheung et al. .............. 313/503 |
| 6,594,506 B1 * | 7/2003 | Vapaakoski et al. ........ 455/557 |
| 6,618,013 B1 * | 9/2003 | Aldous ........................ 343/702 |

* cited by examiner

| BIT SYNC | FRAME SYNC | PAYLOAD | CRC |

CREDIT CARD COMMUNICATION SYSTEM

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to communications systems, and more particularly to a miniaturized communications system.

Miniaturization of commercial communications systems has focused upon the use of micro-cellular architectures, such as the one shown in FIG. 1 which employs one high power base station transmitter 20 to communicate to remote communication devices 22 and many micro-cell receivers. Given that the remote communication devices only radiate a low power radio frequency (RF) signal, many receivers are required to encompass the area of the high power transmitter. Given the multitude of receivers required, the micro-cellular architecture is costly. Due to the fluid and ever-changing military battle space, traditional commercial communication systems are unsuitable for military deployment.

Thus, a need exists for a miniaturized communication system with an architecture suitable for military deployment. Preferably, the architecture includes one base station which can be located in an aircraft (manned or unmanned) or atop a tower.

BRIEF SUMMARY OF THE INVENTION

A system for communications is disclosed. The system includes a base station and wireless long-range communication devices which are approximately the size of a credit card.

Preferably, the base station includes a high temperature superconductivity receiver.

In accordance with other aspects of the invention, the wireless communication devices each include a transceiver, a man machine interface, a processor, a power supply and an antenna.

In accordance with still other aspects of the invention, preferably, the transceiver includes a frequency shift keying receiver. Preferably, the transceiver includes a direct sequence spread spectrum modulator with differential phase shift keying.

In accordance with yet other aspects of the invention, the man machine interface includes a display. Preferably, the display is a thin polymer emissive display that is capable of displaying both graphical and textual information. Preferably, the man machine interface includes pushbuttons (e.g., four pushbuttons).

In accordance with further aspects of the invention the power supply includes a battery. Preferably, the battery is a primary lithium non-rechargeable battery or a secondary lithium polymer rechargeable battery. Preferably, the power supply also includes a constant current source charger and a low dropout analog regulator.

In accordance with still further aspects of the invention, the antenna is either a monopole antenna, a dipole antenna, or a patch antenna.

In accordance with yet further aspects of the invention, the communications system is a voice response architecture and includes a microphone. Preferably, the voice response architecture also includes an integrated broadband processor.

BRIEF DESCRIPTION OF THE DRAWINGS

These as well as other features of the present invention will become more apparent upon reference to the drawings wherein.

DETAILED DESCRIPTION OF THE INVENTION

Figure 1:
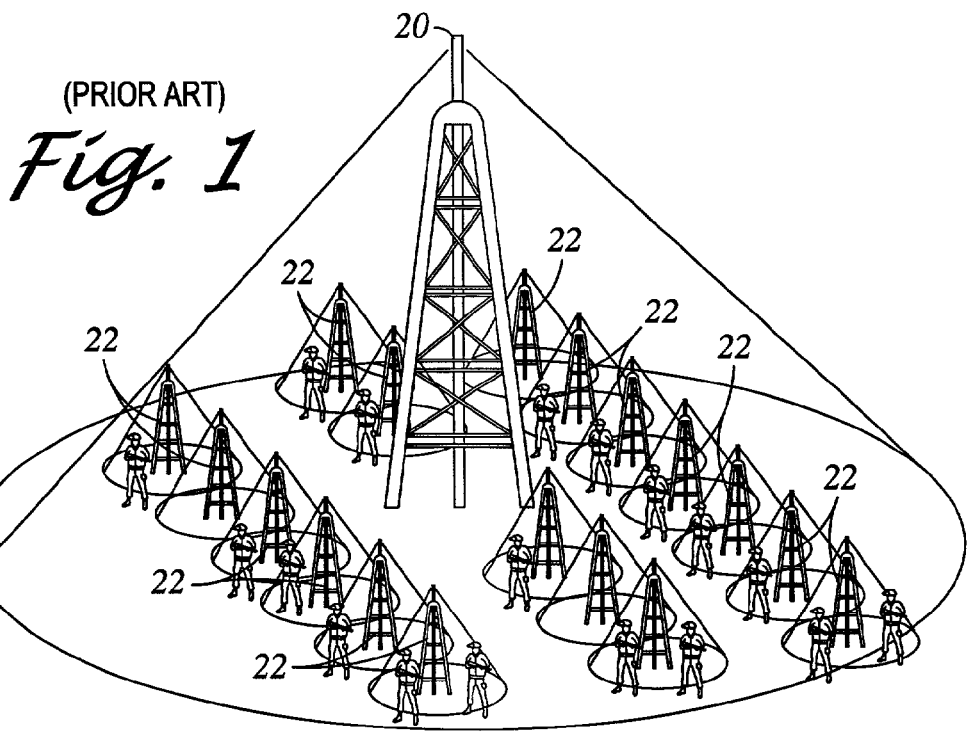
FIG. 1 is a diagram of an exemplary prior art commercial micro-cellular architecture.
Figure 2:
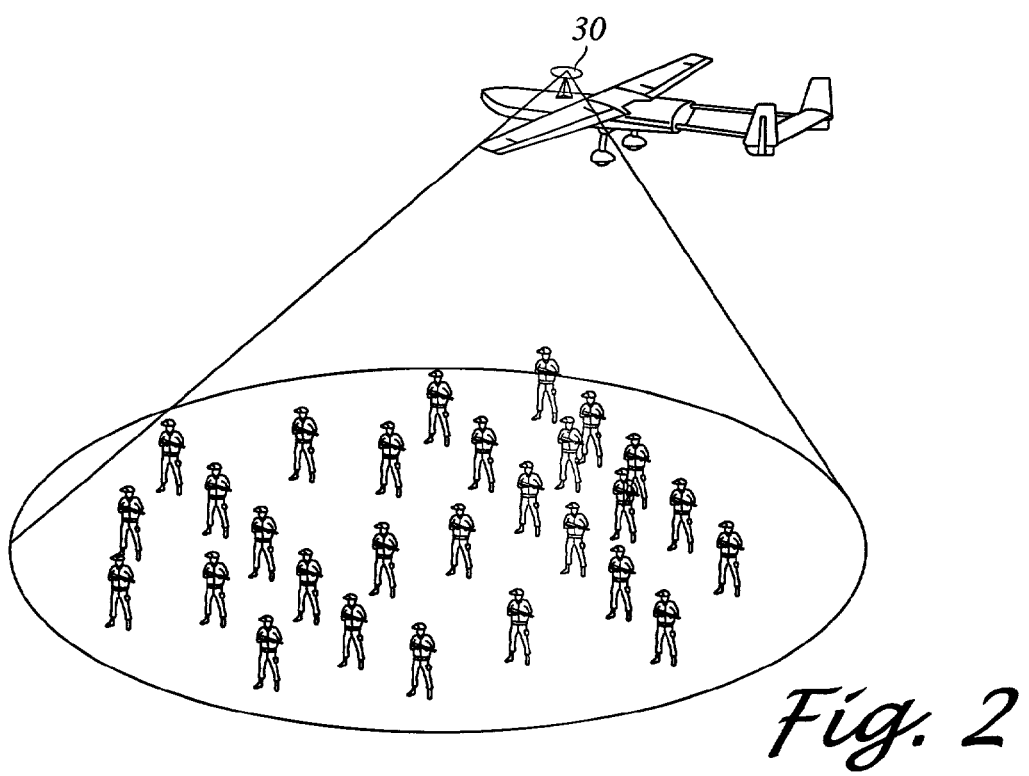
FIG. 2 is a diagram of an exemplary architecture formed in accordance with the present invention.

The exemplary architecture of the present invention shown in FIG. 2 is a network architecture which includes a single high power base station 20 which communicates with credit card size wireless communications devices. Thus, the invention is referred to as a Credit Card Communications System (C3S) herein. Due to the single base station (or interrogator) architecture, the C3S system is capable of quick setup and mobility which can accommodate battle field operations. While ideally suited for military operations, it will be appreciated that the present invention is not so limited. For example, the invention has commercial uses, such as a credit card sized pager, preferably with smart card capabilities. The invention can also be used as a reduced function device which serves as a low cost long-range active radio frequency identification device (RFID). For example, several of the credit card sized communication devices can be put on several sides of a pallet or container. Traditional RFIDs are much more costly than the credit card sized communication device of the present invention because smart card form factor devices can be mass produced (for example, using reel-to-reel processing). The credit card communication system of the present invention can communicate with a Global Positioning System (GPS) such that the credit card communications device can receive its location and can then upload its location to the base station.

Another application of the present invention is for the credit card communications device to receive information which includes a phone number. The card is then inserted into a phone and the phone number is automatically dialed. It will be appreciated that the above examples illustrate a few possible applications of the credit card communications system of the present invention and that many other applications are possible.

Figure 3:
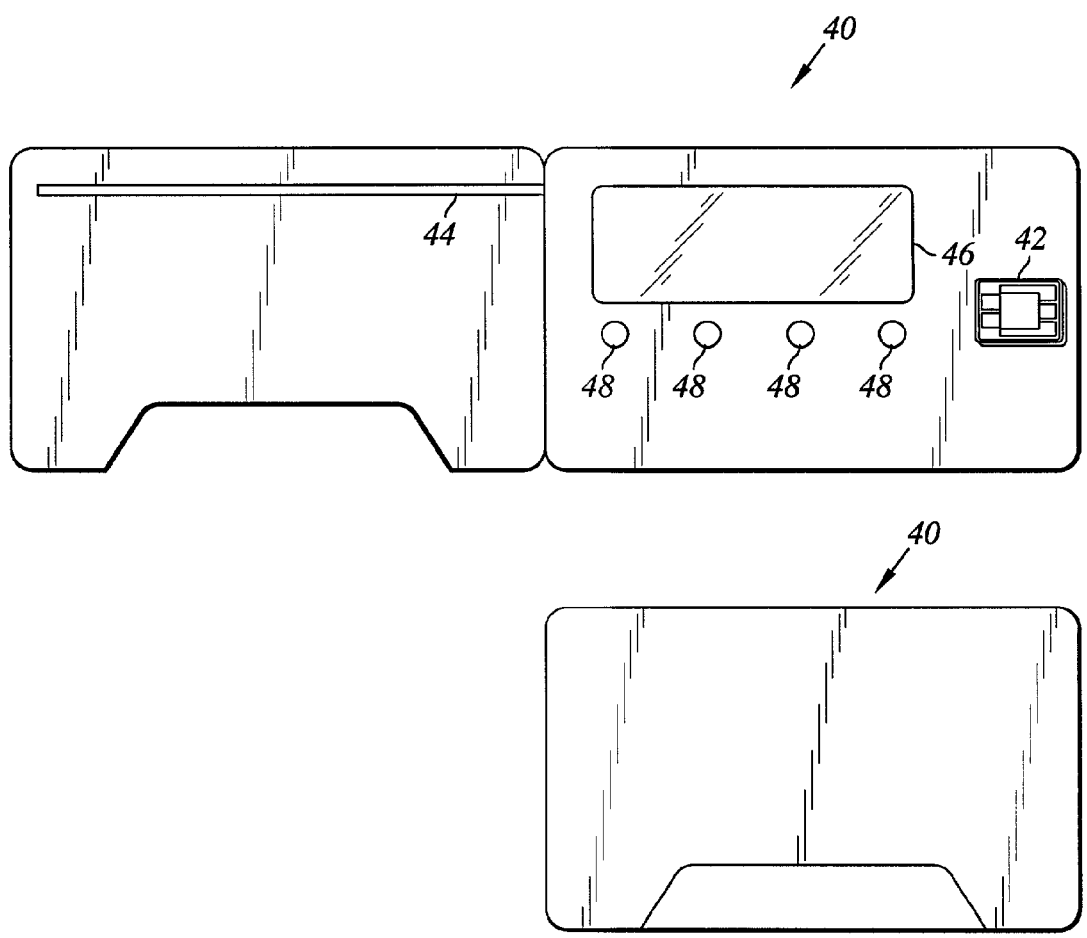
FIG. 3 is an exemplary configuration of the credit card communications system of the present invention.

As illustrated in FIG. 2. the C3S utilizes a single high power forward channel transmitter 30. Because the communicator of the C3S uses a simple receiver due to the aggressive size constraints, preferably, FSK modulation is utilized. In exemplary embodiments, the C3S employs high temperature superconductivity technology and spread spectrum coding to improve base sensitivity which eliminates the need for multiple micro-cellular receivers. Due to the enhanced base station, the C3S communicator's radio frequency output power is very low which increases battery life and enables using a small planar battery. FIG. 3 illustrates an exemplary configuration of the C3S credit card 40. The packaging of the credit card 40 is a smart card form factor (e.g., approximately 9.6 cm×6.4 cm with a thickness of 0.79 mm) and includes a complex transceiver 42, an antenna 44 and a man machine interface (MMI). Preferably, the communicator's MMI includes a display 46, such as a dot matrix display, push buttons 48 and a microphone (not shown). Although a smart card form factor is preferable, it will be appreciated tat other configurations can be used, for example, the card can be a magnetic stripe card.

Text or graphical information is delivered to the communicator, for example, via a forward channel frequency shift keying (FSK). The user can communicate with the base station (e.g., using predetermined responses and/or compressed voice) via, for example, the direct sequence spread spectrum (DSSS), phase shift keying (PSK) reverse channel. Preferably, the C3S single base station architecture of the invention is predicated upon a forward channel high power base station and an optimized reverse channel. The architecture combines various technologies, for example, DSSS, a high temperature superconductivity receiver, and an adaptive base station antenna array. Together these technologies allow a low power C3S transmitter to communicate with the base station with an acceptably low error rate.

Preferably, the invention employs DSSS reverse channel in order to improve interrogator sensitivity and to reject unwanted signals. Due to the nature of DSSS communications, when transmissions from remote transmitters are correlated, interfering signals are de-correlated. This allows for rejecting of unwanted signals that are not strong enough to overload the receiver's low noise amplifier (LNA).

The sensitivity of the interrogator is a function of temperature and bandwidth. For a DSSS based link, the bandwidth is the coherent bandwidth for the focused code. Preferably, the C3S utilizes a focused code bandwidth of 1000 hertz and a temperature of 77 degrees Kelvin.

An adaptive interrogator antenna array helps reject unwanted signals because unwanted signals which are not located at the same geolocation as wanted signals can be rejected by use of a sectored gain antenna array or an adaptive sectored gain antenna array. The adaptive sectored antenna array subtracts the unwanted signal from the wanted signal thus canceling the unwanted signal.

The sensitivity of a receiver is defined primarily by its noise figure and noise power. High temperature superconductivity (HTS) allows the LNA and front end power filter RF components to be constructed such that a noise figure of less than 0.5 dB can be realized. In addition, noise power is set by the system's temperature and bandwidth. Thus, the overall interrogator receiver sensitivity can be as great as −186 dBm.

As described in further detail below, in exemplary embodiments, a convergence of technologies allow a C3S communicator to: perform long range communications (e.g., approximately 30 kilometers); be a self-contained credit card form factor; include an MMI with a flexible emissive display; and have low recurring costs. Long range communications are accomplished via the following technologies: an HTS interrogation receiver; a low profile efficient antenna, DSSS, and an interrogator adaptive antenna array. A self-contained smart card form factor is accomplished using the following technologies: a thinned flexible die (which produces a flexible card), printed integrated passives thus eliminating discrete resistors and capacitors, thus reducing manufacturing costs, a flip chip on flex (die attachment method where the die is attached to the substrate material with solder ball connection pads), a thin lithium polymer battery, a Micro Electro Mechanical Systems (MEMS) microphone and a low profile efficient antenna. The technology of a thin polymer emissive display is used for an integrated MMI. The following are exemplary technologies that contribute to low recurring costs for producing credit card communications systems in accordance with the invention: reel-to-reel production and fluidic self assembly. Fluidic Self Assembly (FSA™) is a process which decouples the fabrication of transistors from the processing of display materials and permits the efficient assembly of drive electronics into all types of Flat Panel Displays (FPDs) . For example, see www.alientechnology for a description of FSA™ developed by Alien Technology™. It will be appreciated that FSA processing can be applied to devices other than displays.

Figure 4:
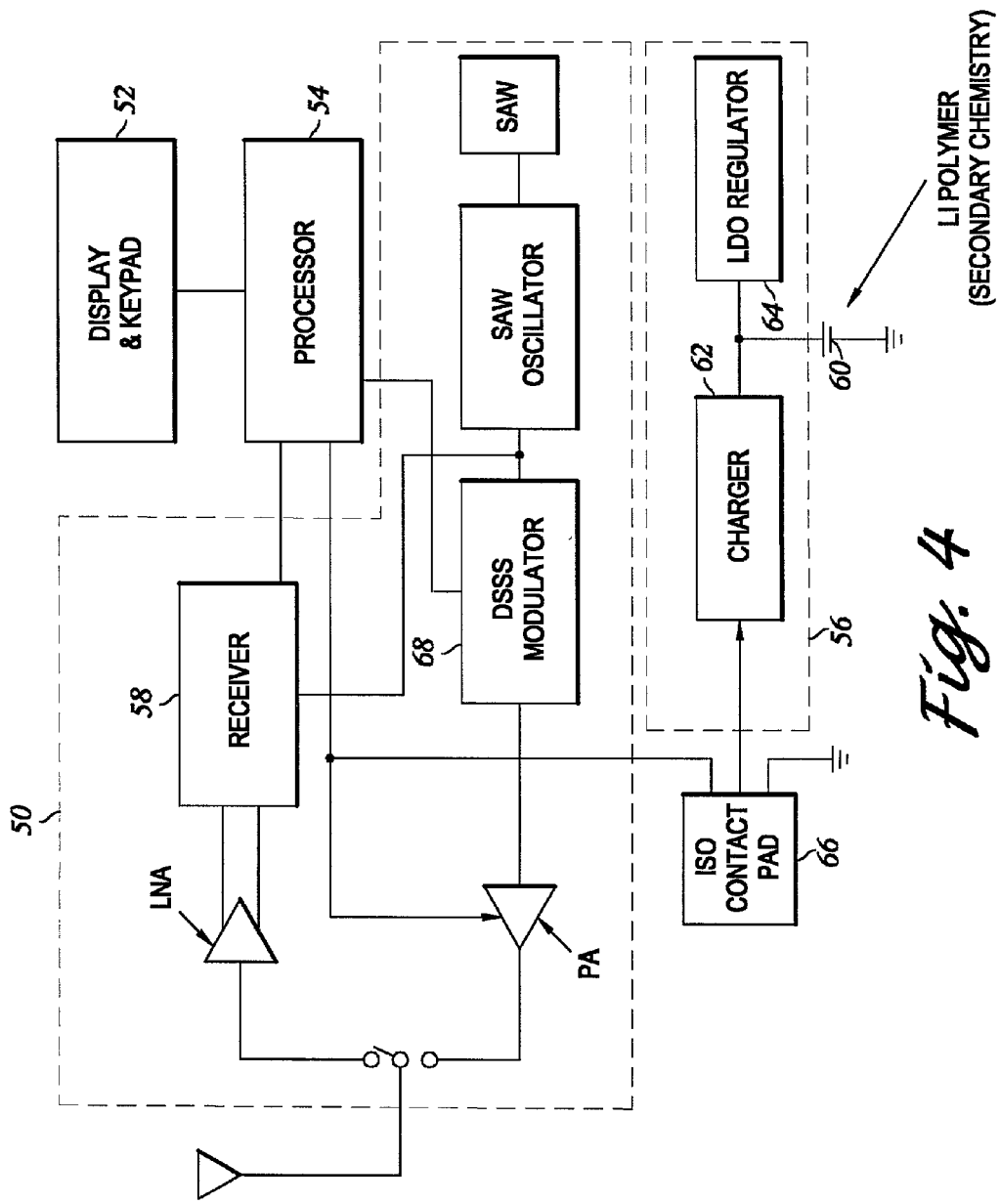
FIG. 4 is a block diagram of an exemplary architecture of a credit card communication system of the present invention.

The exemplary architecture of a credit card communications system formed in accordance with the present invention shown in FIG. 4 includes four primary subsystems: a transceiver 50, a man machine interface 52, a processor 54 and a power supply 56. An exemplary transceiver utilizes a single conversion Frequency Shift Keying (FSK) receiver 58 to provide a robust means of transmitting information to the card. Preferably, receiver 58 is a single Application Specific Integrated Circuit (ASIC) device. Preferably, the transmitter is implemented with a direct sequence spread spectrum (DSSS) differential phase shift keying (DPSK) modulation 68 to provide rejection to interference and enhance reverse channel link range.

In exemplary embodiments, the man machine interface 52 is implemented with a one-quarter VGA size dot matrix (46 of FIG. 3) display and four push buttons (48 of FIG. 3). Preferably, the display 46 can hold a combination of text and graphics. For example, the display can be utilized to hold context sensitive textual prompts such that the user will reuse the four push buttons for multiple functions.

The primary function of the processor 54 is to process the forward channel information for display and to generate the reverse channel information. In exemplary embodiments, the forward channel uses a simple repetition due to the simplicity of processing (which minimizes power consumption) and high forward channel carrier to interference (C/I). Preferably, the reverse channel utilizes a robust forward error correcting code.

Preferably, the power supply 56 includes of a single Lithium (Li) polymer secondary chemistry (rechargeable) battery 60 along with a constant current source charger 62 and a low drop out analog regulator (LDO) 64. While a switch mode regulator is normally more efficient than an analog regulator, a magnetic element of sufficient size is difficult to realize with an integrated passive structure. With respect to analog regulators, the low drop out regulator circuit topology is the most efficient and can be matched to the battery's inherent flat discharge curve to maximize efficiency.

Figure 5:
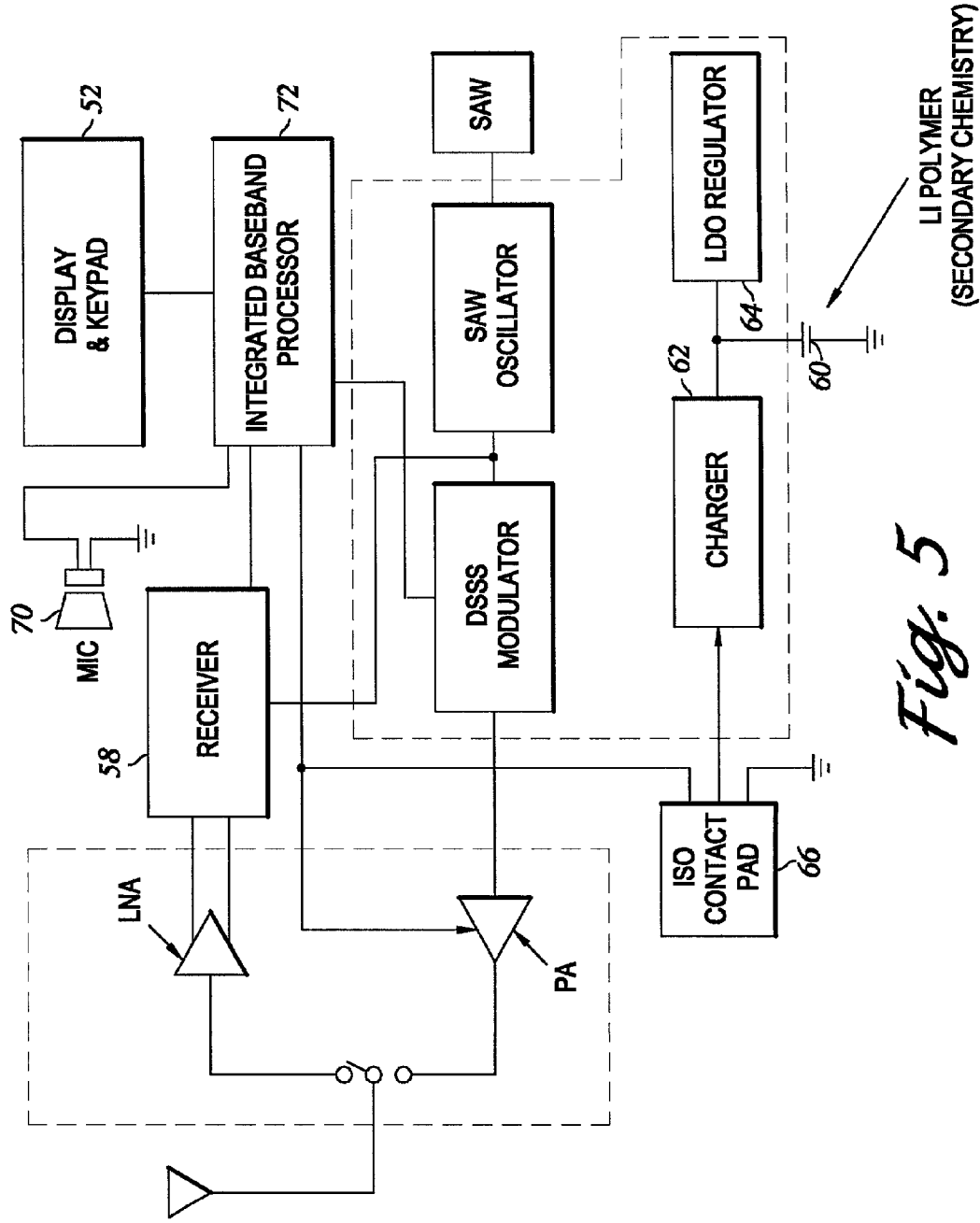
FIG. 5 is a block diagram of an alternative (voice response) architecture of a communication system of the present invention.

An alternative architecture is a voice response architecture such as the one shown in FIG. 5. The voice response architecture is similar to the exemplary architecture shown in FIG. 4, but with two significant differences: (1) a microphone 70 (e.g., a MEMS microphone) is included to allow a voice information to be transferred by the user to the base station; and (2) the efficient transmission of voice traffic is permitted on the reverse channel coding. Preferably, the coding function includes vocoding (compression), forward error correction coding, framing, etc. included in an integrated baseband processor 72.

Figure 6:
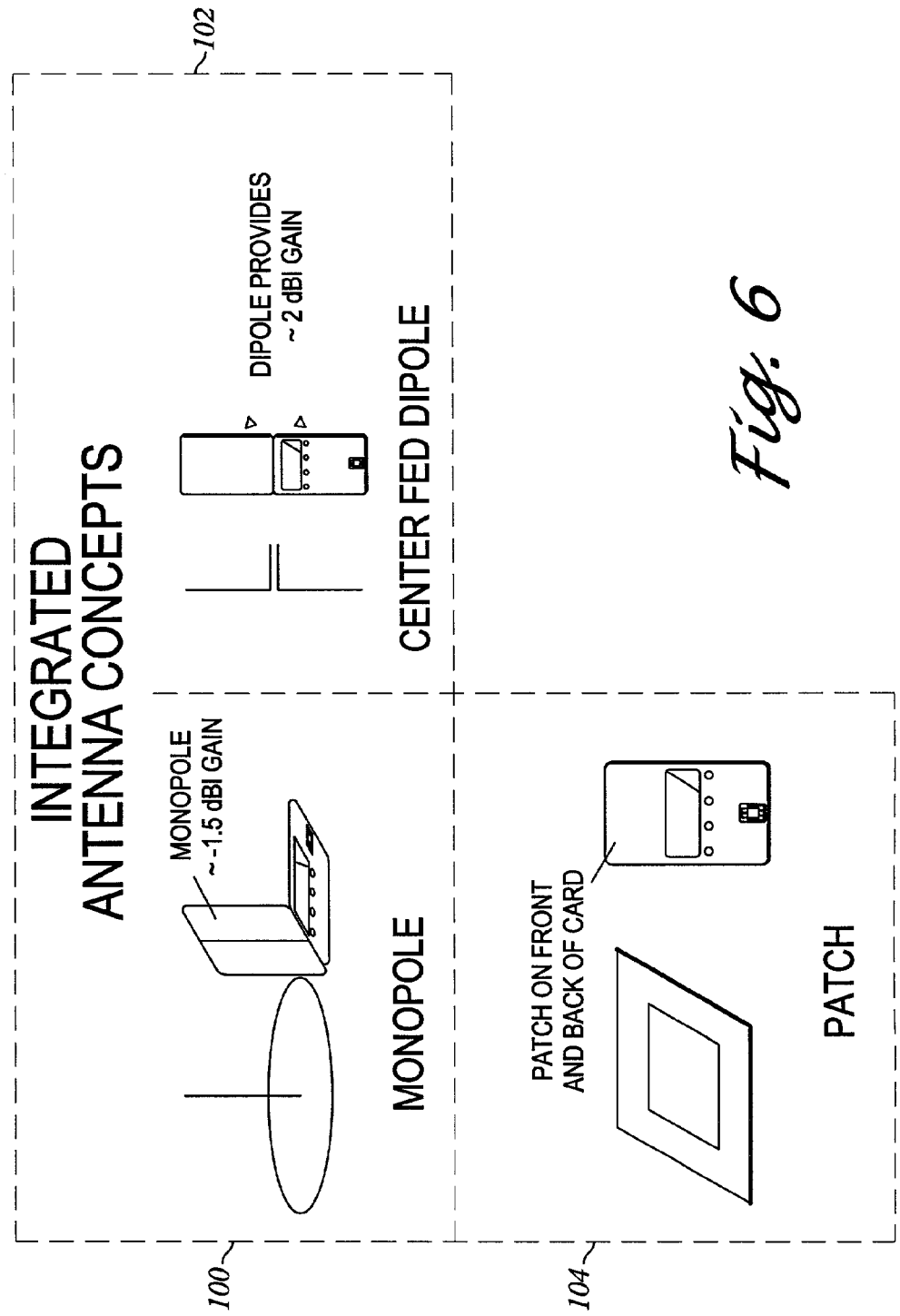
FIG. 6 illustrates exemplary antenna configurations suitable for use in an exemplary architecture for the present invention.

Due to the credit card form factor, the antenna configuration used must be capable of integrating into the credit card form factor. FIG. 6 illustrates three possible antenna designs: a monopole antenna 100, a dipole antenna 102, and a patch antenna 104.

Preferably, the C3S communicator card's power source is planar and has a high energy density. In exemplary embodiments, a primary non-rechargeable thin Li battery or a secondary rechargeable thin Li polymer battery is used.

An International Organization for Standardization (ISO) standard contact pad (66 of FIG. 4) provides a means of communicating with the C3S's integrated processor via a bi-directional bit serial communications link. In addition, as the contact pad also provides power and ground which can be utilized to charge the battery.

The choice of interrogation protocol utilized to communicate between the base station and the C3S communicator is critical to achieving high battery endurance for the communicator. With any communications protocol development, performance modeling typically is based upon well-known fundamental protocols. Exemplary embodiments of the present invention utilize the reservation aloha model as a basis for the C3S protocol.

Figure 7:
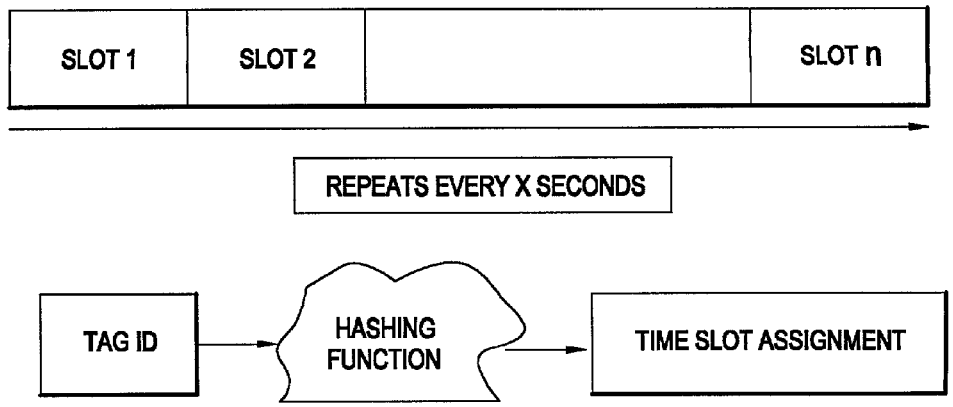
FIG. 7 illustrates the assignment of a unique slot in a master frame via a hashing function.
Figure 8:
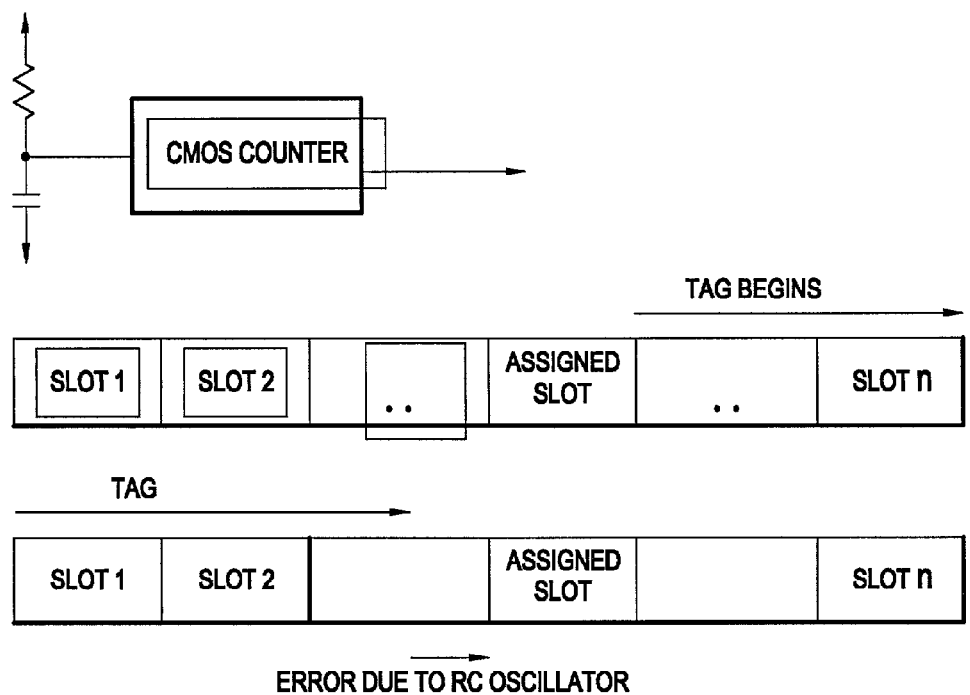
FIG. 8 illustrates how adaptive sleep eliminates variation in resistor capacitor (RC) oscillator frequency due to process and temperature changes.

Aloha is a protocol for satellite and terrestrial radio transmissions. In pure Aloha, a user can transmit at any time but risks collisions with other users' messages. "Slotted Aloha" reduces the chance of collisions by dividing the channel into time slots and requiring that the user send only at the beginning of a time slot. As with any aloha based protocol, time is divided into slots. The C3S protocol groups N slots together into a master frame which repeats every X seconds as shown in FIG. 7. C3S communicators are assigned by default to a unique slot in the master frame via a hashing function, as shown in FIG. 8. The communicator only wakes up from sleep for its assigned time slot(s). The system will assign additional slots for a period of time after an interrogation of the communication to minimize latency for subsequent interrogations.

To enhance power savings during sleep, a low frequency resistor capacitor (RC) oscillator/complementary metal-oxide semiconductor (CMOS) counter is utilized to measure the time the communicator is sleeping. Normally a crystal oscillator is utilized to drive a CMOS counter. However, the crystal oscillator based structure is not desirable due to the C3S communicator's size and power constraints. A low speed oscillator is more efficient but requires a large crystal. Small crystals while possibly fitting on the card would be prohibitively power inefficient.

Figures 9, 10:
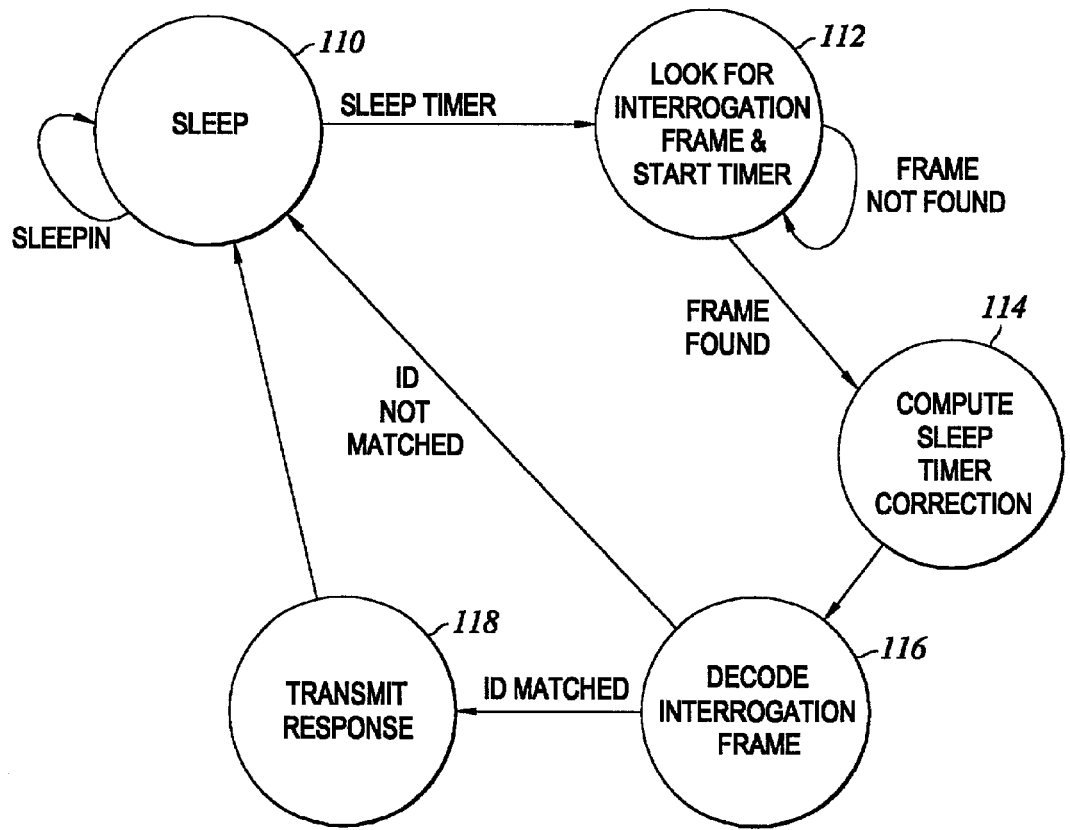
FIG. 9 is an exemplary communications state diagram.
FIG. 10 is an illustration of a forward/reverse channel frame format.

The RC oscillator's accuracy is a function of voltage, temperature and CMOS process variations. Potential problems can be mitigated because the voltage is controlled accurately by the communicator's voltage regulator and temperature and process variations can be handled by adapting the sleep to feedback timing from the base station (or network), as shown in FIG. 10.

An exemplary C3S communications state diagram is shown in FIG. 11. A sleep timer awakens the system from a sleep state 110. Once awakened, the system looks for an interrogation frame and start timer 112. Once the frame is found, the system computes a sleep timer correction 114. The system then decodes the interrogation frame 116. If the ID of the interrogation frame matches (i.e., if the identification matches the unique identification of this credit card communications device) a response (e.g., a keyboard response, a voice message response or a combination there of) is transmitted 118. Once the response has been transmitted 118 or if the ID did not match the system returns to a sleep state 110.

The C3S communication system utilizes identical frame formats for the forward and reverse channels. As shown in FIG. 12, the frame consists of a bit sync, a frame sync, payload and cyclic redundancy check (CRC). The payload can be any arbitrary data, for example, a query ID and time sync information.

Additional modifications and improvements of the present invention may also be apparent to those of ordinary skill in the art. Thus, the particular combination of parts described and illustrated herein is intended to represent only a certain embodiment of the present invention, and is not intended to serve as a limitation of alternative devices within the spirit and scope of the invention.

What is claimed is:

1. A communication system comprising:
a single forward channel transmitter base station;
at least one wireless communications device having an edge and dimensions similar to the length, width, and thickness of a credit card, the at least one device having components embedded therewithin, including:
a receiver;
a man machine interface;
a processor;
a power supply; and
a thin flexible sheet having an antenna embedded therewithin and being pivotally connected to the edge of the at least one device, the sheet being pivotable substantially adjacent the edge to alternate between folded and unfolded positions, the sheet being sized and configured to cover the man machine interface and generally coplanar with the at least one device when in the folded position, the sheet being generally angularly displaced from the at least one device when in the unfolded position, wherein the sheet is deployable to the unfolded position to facilitate communication between the at least one wireless communications device and the base station.

2. The communication system of claim 1, wherein the base station comprises a high temperature superconductivity receiver.

3. The communication system of claim 1, wherein the least one wireless communications device further comprising a transmitter.

4. The communication system of claim 1, wherein the receiver comprises a frequency shift keying receiver.

5. The communication system of claim 1, wherein the receiver comprises a direct sequence spread spectrum modulator.

6. The communication system of claim 5, wherein the direct sequence spread spectrum modulator comprises differential phase shift keying.

7. The communication system of claim 1, wherein the man machine interface comprises a display.

8. The communication system of claim 7, wherein the display is a thin polymer emissive display.

9. The communication system of claim 7, wherein the display is capable of displaying graphical and textual information.

10. The communication system of claim 7, wherein the man machine interface further comprises at least one pushbutton.

11. The communication system of claim 1, wherein the power supply comprises a primary battery.

12. The communication system of claim 11, wherein the primary battery is a lithium non-rechargeable battery.

13. The communication system of claim 1, wherein the power supply comprises a secondary battery.

14. The communication system of claim 13, wherein the secondary battery is a lithium rechargeable battery.

15. The communication system of claim 14, wherein the power supply further comprises:
   a) a constant current source charger; and
   b) a low dropout analog regulator.

16. The communication system of claim 1, wherein the antenna is a monopole antenna.

17. The communication system of claim 1, wherein the antenna is a dipole antenna.

18. The communication system of claim 1, wherein the antenna is a patch antenna.

19. The communication system of claim 1, wherein the system is a voice response architecture and further comprises:
   a) a microphone; and
   b) an integrated broadband processor.

20. The communication system of claim 1, wherein the at least one wireless communications device is structurally flexible.

21. The communication system of claim 1, wherein the at least one wireless communications device and the base station can communicate within in a range of about 30 kilometers.

22. The communication system of claim 1, wherein the single high powered forward channel transmitter base station is located in an aircraft.

23. The communication system of claim 1, wherein the at least one wireless communications device receives its location from a Global Positioning System and uploads the location to the base station.

24. The communication system of claim 1, wherein the at least one wireless communications device communicates with the single forward channel transmitter base station using an interrogation protocol.

25. The communication system of claim 1, wherein the at least one wireless communications device has a thickness of about 0.79 mm.

26. The communication system of claim 1, wherein the at least one wireless communication device has a length of about 9.6 cm and width of about 6.4 cm.

27. The communications system of claim 22, wherein the aircraft is a remote controlled drone flying within 30 miles of the at least one wireless communications device.

28. A credit card sized wireless communications device comprising:

a smart card produced from a flexible die having a thickness of about 0.79 mm., a length of about 9.6 cm, and width of about 6.4 cm;

a processor integrated within said smart card which utilizes a forward and reverse channel, wherein said processor processes forward channel information for display and generation of reverse channel information, wherein the forward channel utilizes simple repetition to minimize power consumption and high forward channel carrier interference, and wherein the reverse channel utilizes forward error correcting code;

a transceiver mounted within said smart card comprising,
   a receiver embedded in an application specific integrated circuit (ASIC) device which utilizes single conversion frequency shift keying (FSK) for receiving transmitted information, and
   a transmitter which utilizes direct sequence spread spectrum (DSSS) differential phase shift keying (DPSK) modulation for rejecting interference and enhancing reverse channel link range;

a man machine interface integrated into a front side of said smart card including,
   a one-quarter VGA size dot matrix thin polymer emissive display capable of displaying a combination of text and graphics, and
   at least one push button to perform functions;

a contact pad integrated on an exterior side of said smart card for communicating to an integrated processor of a separate base station via a bi-directional serial bit communications link, and for providing power and an electrical ground from an outside source;

a power supply attached within said smart card composed of a high energy density battery having a planar shape, a constant current source charger, and a low drop out analog regulator; and an antenna embedded into said smart card;

wherein said at least one communication device communicates, via a reservation "Slotted Aloha" interrogation protocol, with a high-powered forward channel transmitter base station having a high temperature superconductivity receiver.

29. The communications device according to claim 28, said battery comprising at least one of a single lithium polymer secondary chemistry rechargeable battery, a primary non-rechargeable thin Li battery, and a secondary rechargeable thin Li polymer battery.

30. The communications device according to claim 28, further comprising a voice response feature comprising a MEMS microphone for transmitting voice information, wherein voice traffic is permitted on the reverse channel, wherein said processor has integrated baseband capabilities capable of processing vocodes, forward error correction codes and frames.

31. The communications device according to claim 28, said antenna comprising a monopole antenna embedded on a thin flexible sheet having a length of about 9.6 cm and width of about 6.4 cm, said sheet hinged to an edge of said smart card such that said monopole antenna may be deployed by unfolding said sheet from said platform.

32. The communications device according to claim 28, said antenna comprising a center fed dipole antenna having a first L-shaped portion and second L-shaped portion, each portion having a long and short leg, said first L-shaped portion embedded on a thin flexible sheet having a length of about 9.6 cm and width of about 6.4 cm, said sheet hinged to an edge of said smart card such that said first L-shaped portion may be deployed by unfolding said sheet from said smart card, said second L-shaped portion embedded within said smart card, said short legs of said L-shaped portions configured in a parallel manner about hinged edge of said smart card and flexible sheet.

33. The communications device according to claim 28, said antenna comprising a patch antenna affixed to at least one of a frontside and backside of said smart card.

34. The communications device according to claim 28, said smart card being structurally flexible.

35. The communications device of claim 28, said communications device being able to communicate with a base station within a range of about up to 30 kilometers.

36. The communication system of claim 28, wherein the communications device receives its location from a Global Positioning System and uploads the location to a base station.

37. At least one credit card sized wireless communications device in combination with a single high powered forward channel transmitter base station having a high temperature superconductivity receiver, said at least one credit card sized wireless communications device comprising:
 a smart card produced from a flexible die having a thickness of about 0.79 mm, a length of about 9.6 cm, and a width of about 6.4 cm;
 a processor integrated within said smart card which utilizes a forward and reverse channel, wherein said processor processes forward channel information for display and generation of reverse channel information, wherein the forward channel utilizes simple repetition to minimize power consumption and high forward channel carrier interference, and wherein the reverse channel utilizes forward error correcting code;
 a transceiver mounted within said smart card comprising,
  a receiver embedded in an application specific integrated circuit (ASIC) device which utilizes single conversion frequency shift keying (FSK) for receiving transmitted information, and
  a transmitter which utilizes direct sequence spread spectrum (DSSS) differential phase shift keying (DPSK) modulation for rejecting interference and enhancing reverse channel link range;
 a man machine interface integrated into a front side of said smart card including,
  a one-quarter VGA size dot matrix thin polymer emissive display capable of displaying a combination of text and graphics, and
  at least one push button to perform functions;
 a contact pad integrated on an exterior side of said smart card for communicating to an integrated processor of a separate base station via a bi-directional serial bit communications link, and for providing power and an electrical ground from an outside source;
 a power supply attached within said smart card composed of a high energy density battery having a planar shape, a constant current source charger, and a low drop out analog regulator; and
 an antenna embedded into said smart card;
 wherein said at least one communication device communicates, via a reservation "Slotted Aloha" interrogation protocol, with a high-powered forward channel transmitter base station having a high temperature superconductivity receiver.

38. The communications device according to claim 37, said battery comprising at least one of a single lithium polymer secondary chemistry rechargeable battery, a primary non-rechargeable thin Li battery, and a secondary rechargeable thin Li polymer battery.

39. The communications device according to claim 37, further comprising a voice response feature comprising a MEMS microphone for transmitting voice information, wherein voice traffic is permitted on the reverse channel, wherein said processor has integrated baseband capabilities capable of processing vocodes, forward error correction codes and frames.

40. The communications device according to claim 37, said antenna comprising a monopole antenna embedded on a flexible sheet having a length of about 9.6 cm and width of about 6.4 cm, said sheet hinged to an edge of said smart card such that said monopole antenna may be deployed by unfolding said sheet from said platform.

41. The communications device according to claim 37 said antenna comprising a center fed dipole antenna having a first L-shaped portion and second L-shaped portion, each portion having a long and short leg, said first L-shaped portion embedded on a flexible sheet having a length of about 9.6 cm and width of about 6.4 cm, said sheet hinged to an edge of said smart card such that said first L-shaped portion may be deployed by unfolding said sheet from said smart card, said second L-shaped portion embedded within said smart card, said short legs of said L-shaped portions configured in a parallel manner about hinged edge of said smart card and flexible sheet.

42. The communications device according to claim 37, said antenna comprising a patch antenna affixed to at least one of a frontside and backside of said smart card.

43. The communications device according to claim 37, said smart card being structurally flexible.

44. The communications device of claim 37, said communications device being able to communicate with said base station within in a range of about up to 30 kilometers.

45. The communication system of claim 37, wherein the communications device receives its location from a Global Positioning System and uploads the location to a base station.

46. The communication system of claim 37 wherein said single high powered forward channel transmitter base station is located in an aircraft.

47. The communications system of claim 46, wherein the aircraft is a remote controlled drone flying within 30 miles of said at least one credit card sized wireless communications device.

48. A communications device comprising a flexible smart card having a length, width, and thickness similar to the dimensions of a credit card, said smart card having components embedded within including a receiver, an antenna, a man machine interface, a processor, and a power supply, wherein said device communicates with a base station, and wherein said antenna comprises a center fed dipole antenna having a first L-shaped portion and second L-shaped portion, each portion having a long and short leg, said first L-shaped portion embedded on a thin flexible sheet having a length of about 9.6 cm and width of about 6.4 cm, said sheet hinged to an edge of said smart card such that said first L-shaped portion may be deployed by unfolding said sheet from said smart card, said second L-shaped portion embedded within said smart card, said short legs of said L-shaped portions configured in a parallel manner about the hinged edge of said smart card and said sheet.

49. A wireless communications device communicable with a base station, the device comprising:

a device body having an edge and dimensions similar to the length, width, and thickness of a credit card, the device body having components embedded within, including:
 a receiver;
 a man machine interface;
 a processor;
 a power supply; and
a thin flexible sheet having an antenna embedded therewithin and being pivotally connected to the edge of the device body, the sheet being pivotable substantially adjacent the edge to alternate between folded and unfolded positions, the sheet being sized and configured to cover the man machine interface and generally coplanar with the device body when in the folded position, the sheet being generally angularly displaced from the device body when in the unfolded position, wherein the sheet is deployable to the unfolded position to facilitate communication between the device and the base station.

50. The device of claim 49 wherein the device body is flexible, and the body is conformable to the sheet.

51. The device of claim 49 wherein the sheet is generally coplanar with the device body when in the folded position.

\* \* \* \* \*